United States Patent Office 3,383,890
Patented May 21, 1968

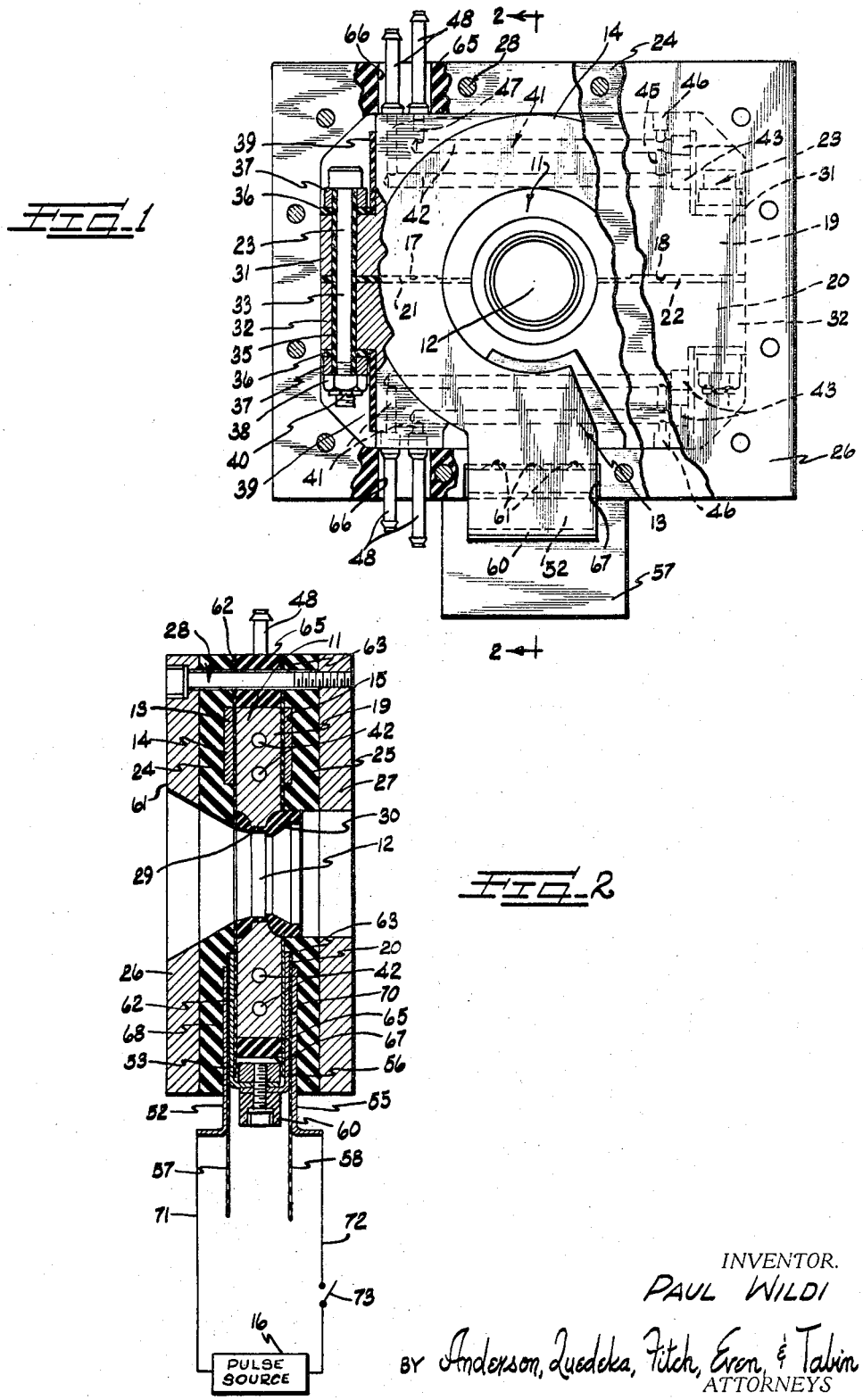

3,383,890
COIL ASSEMBLY FOR MAGNETIC
FORMING APPARATUS
Paul Wildi, San Diego, Calif., assignor to General Dynamics Corporation, New York, N.Y., a corporation of Delaware
Filed Feb. 23, 1966, Ser. No. 529,499
8 Claims. (Cl. 72—56)

This invention relates to magnetic apparatus and, more particularly, to an improved coil assembly for an apparatus which forms material by energy acquired from a varying magnetic field.

Apparatus has been developed for forming materials by employing varying magnetic fields of high intensity. An example of such apparatus is shown and described in the U.S. Patent No. 2,976,907, issued Mar. 28, 1961, and assigned to the assignee of the present invention. In apparatus of this general type, an electrical current pulse of high amperage is passed through a conductive forming coil, thereby producing a pulsed magnetic field of high intensity. The magnetic field induces a current in a conductive workpiece positioned in the pulsed magnetic field. This induced current, in turn, interacts with the magnetic field to produce a force acting on the workpiece. If the force is sufficiently strong, a deformation of the workpiece results. The shape of the deformation is dependent upon the shape of the magnetic field and the position of the workpiece relative to the field. Repeated pulses of current may be applied to the conductive coil, thus causing a series of deforming impulses to be applied to the workpiece.

In some circumstances, greater force concentration then can ordinarily be obtained from a conductive coil alone is provided by employing a magnetic field shaper. When used in conjunction with an elongated workpiece, the field shaper is generally in the form of a conductive body having at least one opening therein for receiving the workpiece. The area of the opening is ordinarily smaller than the area enclosed by the coil. The field shaper is disposed relative to the coil such that the pulsed magnetic field produced by the coil induces a pulsed current in the field shaper. This current pulse creates a magnetic field in the opening which is more intense than that produced by the coil because of the increased flux density within the opening due to its smaller area.

The flux density within the opening and, therefore, the force on the workpiece are dependent upon the shape of the inner surface of the field shaper and upon the location of the inner surface relative to the workpiece. The flux density may be increased in certain areas of the workpiece by providing inwardly extending projections on the inner surface of the field shaper in the vicinity of such areas. For example, a tube can be constructed intermediate its ends through the use of a field shaper which includes a flange projecting inwardly from its inner surface to define a narrow throat.

In order to develop magnetic fields of sufficient strength to produce the desired deformation in the workpiece, the forming coil assembly operates at relatively high levels of electrical power. High power operation produces several difficulties. Such high levels of power tend to produce high forces which may tend to cause movement in certain parts of the coil assembly. Such movement may cause excessive wear of electrical insulation in critical places. High power operation also tends to produce extreme heat which may cause failure of the structural elements of the coil assembly or of the insulation therein. Voltages necessary to produce the desired power levels may cause large differences in potential between various parts of the coil assembly. This increases the danger of electrical flashover or breakdown across electrical insulation at various points in the coil assembly. The high amperage required to produce correspondingly high power may be limited, as a practical matter, by physical size limitations on the conductive coils used in the coil assembly. Finally, although care is taken in construction of the coil assembly, parts naturally tend to wear out or, possibly, to break down. Replacing the entire coil assembly is costly and it is therefore desirable to be able to readily disassemble the coil assembly in order to replace or repair individual parts thereof.

It is an object of this invention to provide an improved coil assembly for a magnetic forming apparatus.

Another object of the invention is to provide a coil assembly for a magnetic forming apparatus which is capable of operating at relatively high power levels with a life expectancy of practical duration.

A further object of the invention is to provide a coil assembly for a magnetic forming apparatus which can be readily disassembled for repair or replacement of parts therein.

Other objects and various advantages of the invention will become apparent from the following description taken in connection with the accompanying drawing wherein:

FIGURE 1 is an elevational view, with parts broken away, of a coil assembly for a magnetic forming apparatus constructed in accordance with the invention; and FIGURE 2 is a sectional view taken along the line 2—2 of FIGURE 1 and showing a schematic diagram of an electrical circuit which may be used with the coil assembly.

Briefly, the coil assembly shown in the drawing includes a field shaper 11 in the form of a plate and defining at least one opening 12 for receiving a conductive workpiece (not shown).

The coil assembly further comprises a conductive coil 13 having a pair of flat turns 14 and 15, each of which is positioned adjacent to one surface of the field shaper so that a magnetic field produced by the coil is intensified within the opening 12. The coil is electrically coupled to a source of current pulses 16 so that the coil produces a pulsed magnetic field. The field shaper 11 has two slots 17 and 18 therein extending from the periphery of the field shaper to the opening 12 such that the field shaper is comprised of two discrete portions 19 and 20. Layers 21 and 22 of insulating material are respectively disposed in the slots 17 and 18. The portions 19 and 20 of the field shaper 11 on opposite sides of the slots 17 and 18 are mechanically coupled by a pair of securing means 23. Insulating members 24 and 25 are respectively disposed adjacent the turns 14 and 15 of the coil 13 for holding the turns against the field shaper 11. Flat metallic end plates 26 and 27 are respectively disposed adjacent the insulating members 24 and 25. These end plates serve as structural support members and additionally confine the magnetic field produced by the coil 13. The field shaper 11, coil 13, insulating members 24 and 25 and end plates 26 and 27 are held together in a sandwich assembly by fastening means 28.

Referring now more particularly to the details of the coil assembly, the illustrated field shaper 11 is made of a suitable conductive metal and defines a central circular opening 12 for receiving a conductive workpiece (not shown) to be formed. The field shaper 11 is generally rectangular in form and is of substantially greater dimensions in directions normal to the axis of the opening 12 than in the direction parallel to the axis thereof. In other words, the field shaper is in the form of a plate through which the opening 12 passes. Thus, the greater portion of the mass of the field shaper 11 is in the direction of the shock wave which is produced in the opening when the workpiece is formed therein. This enables the field shaper 11 to withstand relatively strong shocks and permits the use of higher power in the forming operation.

An annular flange 29 projects inwardly from field shaper 11 into the opening 12 and is provided for increasing the flux density in the area of the flange 29 by defining a narrow throat. An insulating insert 30, of resilient material, is snapped into the position in opening 12 to cover and protect the annular flange 29. The illustrated configuration of the surface of the field shaper in the opening 12 is shown by way of example only, and it is to be understood that other surface configurations may be used in accordance with the invention, depending upon the desired shape of deformation in the workpiece.

The field shaper 11 shown in the drawings is provided with the pair of aligned slots 17 and 18. Each of slots 17 and 18 extends from the outer periphery of the field shaper 11 all the way to the opening 12. Thus, the field shaper 11 is separated by slots 17 and 18 into the two halves or portions 19 and 20. The two portions 19 and 20 of the field shaper 11 on opposite sides of the slots are insulated from each other by the layers of insulation 21 and 22 disposed respectively in the slots 17 and 18. The insulation layers 21 and 22 may be of any suitable insulating material, having reasonable temperature and mechanical properties, such as a phenolic compound.

As will be explained subsequently, very high voltages are induced in the field shaper 11 by the coil 13 associated therewith. These high voltages, in turn, provide a current flow and induce a very strong magnetic field in the opening 12. At least one slot is necessary in the field shaper 11 to prevent the field shaper from constituting a closed loop and thereby preclude a magnetic field from being established in the opening 12. It has been found that, on occasion, the high potential difference between the portions of the field shaper on opposite sides of a slot may cause flashover across the layer of insulation in the slot and a consequent reduction in the efficiency of the apparatus. Such flashover can also cause a breakdown of the insulation and eventual short circuiting. By providing the two slots 17 and 18, the potential difference between the portions of the field shaper on opposite sides of each slot is much less than what would exist in the case of a single slot. This permits substantially higher power to be utilized in the coil assembly for a given thickness of insulation.

During operation of the coil assembly, the production of relatively high power pulsed magnetic fields subject the field shaper to severe shock waves, the force of which tends to extend radially outward from the opening 12. In order to secure the two separate portions 19 and 20 of field shaper 11 together against such forces, the portions 19 and 20 are coupled together by the pair of securing means 23. Each of the illustrated securing means 23 includes a pair of oppositely disposed clamping appendages 31 and 32, respectively. Suitable openings are provided in each of the appendages for accommodating a threaded bolt 33 which extends completely through corresponding pairs of appendages 31 and 32. Each of the bolts 33 is surrounded by an insulating sleeve 35 to insulate the bolt from the field shaper 11. Further insulation is provided by insulation washers 36 at each end of the bolt. Each of the bolts 33 is tightened against a pair of washers 37, one at each end of the bolt, by means of a slotted hexagonal nut 38. Each of the nuts 38 is held in place by a cotter pin 40. Strips of insulation 39 are provided along the edge of the field shaper 11 adjacent the ends of the bolts 33 in order to insure that the bolts are electrically insulated from the field shaper.

By proper tightening of the bolts 33, the portions 19 and 20 of field shaper 11 on opposite sides of the slots 17 and 18 may be drawn toward each other against the insulation layers 21 and 22 to a desired level of prestress. This prestressing of the bolts 33 is preferably above the peak force resulting from the shock wave produced in opening 12, which force tends to push the two portions 17 and 18 of the field shaper 11 apart. Thus, relative motion of the portions of the field shaper 11 is minimized, avoiding wear on the insulation layers 21 and 22 and on other insulation to be described subsequently. This leads to a longer insulation life for operation at a given power level or, conversely, enables operation at a higher power level for a given insulation life.

During operation of the coil assembly which is described in greater detail subsequently, strong magnetic fields are established and a large amount of heat is thereby produced in the coil assembly. More heat is produced in the field shaper 11 than in any of the other elements of the coil assembly. In order to facilitate removal of this heat, each portion 19 and 20 of the field shaper 11 is provided with a coolant conducting passage 41 therein through which an internal coolant flow may be established to carry away the heat. In the coil assembly shown in the drawings, each coolant passage 41 is formed by a pair of drilled holes 42. The holes 42 are bored from one end of the field shaper 11 (right hand in FIGURE 1) and are provided, at such one end, with sealing plugs 43. Near the same end of the holes 42, a further hole 45 is drilled and extends perpendicular to the holes 42, intersecting same and providing communication between the holes 42. The outer ends of drilled holes 42 opposite plugs 43 are terminated prior to emergence from the field shaper. Two holes 47 are provided at this end of holes 42 perpendicular thereto, and each of the holes 47 communicates with a respective one of the holes 42. Suitable coolant flow connectors 48 are provided communicating with respective ones of the holes 47. One of the connectors 48 serves as the coolant inlet connector and the other as the coolant outlet connector. Accordingly, a flow of coolant may be established in the passage 41 for cooling the field shaper 11.

The current pulse which is induced to flow in the surface of the field shaper 11 is produced by the coil 13. The coil 13 shown in the drawing, is formed of two single coplanar and circular turns 14 and 15, one on each side of the field shaper 11. However, it is to be understood that a coil with several turns in each plane or a coil having a single turn in one plane, may also be utilized. The configuration of each turn 14, 15 is substantially flat, that is, the axial dimension of the turn is minimal. Each turn 14, 15 is also of an elongated rectangular cross section, being formed out of a wide strip of conductive material. By forming each turn 14, 15 in this manner, the coil 13 presents a large surface area to the field shaper 11 with minimal axial dimension and is capable of carrying relatively high currents for a given current density or, conversely, for a given current the coil will conduct with relatively lower current density. The latter factor contributes to correspondingly lower thermal stresses.

Each of the turns 14 and 15 is provided with connector ears 52, 53 and 55, 56, respectively. These ears are extensions of overlapping portions of the respective turns 14 and 15, which overlapping portions are respectively separated by sheets of insulation 57 and 58. Each of ears 52–56 is formed with a right angle bend for interconnecting the turns and for making electrical connection to the turns. The turns 14 and 15 are interconnected in series by firmly clamping the right angle portions of the inwardly extending ears 53 and 56 against each other in a clamping block 60 by a plurality of clamping bolts 61. In this manner, substantial abutting areas of the right angle portions provide good electrical contact without the need for soldering or brazing. The outerwardly extending ears 52 and 55 provide for connection of electrical leads to complete the series circuit in which the turns 14 and 15 are disposed, which circuit will be explained in greater detail subsequently.

In order to insulate the turns 14 and 15 from the field shaper 11, and to permit placement of the turns close to the field shaper to provide maximum magnetic coupling between the field shaper and the turns, relatively thin insulating sheets 62 and 63 are disposed on opposite sides of the field shaper 11 between the field shaper and the utrns 14 and 15. The sheets 62 and 63 are comprised of a suitable insulating material, such as Mylar, and are provided with a central opening corresponding in alignment with opening 12 to permit free passage of a work piece into opening 12. In addition to providing for close magnetic coupling between the turns 14 and 15 and the field shaper 11, the fact that the turns are against the sheets 62 and 63 and the sheets are against the field shaper permits good heat transfer between the turns and the field shaper 11. Since the field shaper 11 is cooled, heat from the turns 14 and 15 which passes through the sheets to the field shaper is readily carried away by the coolant.

In the illustrated embodiment, the outer edge of the field shaper 11 is insulated by an insulating gasket-like spacer 65 which surrounds the outer periphery of the field shaper 11. The spacer 65 also helps to position the field shaper 11 with respect to the other elements of the apparatus. The spacer 65 is provided with openings 66 therein for accommodating the coolant connectors 48. A recess 67 is also provided in the periphery of the spacer 65 to accommodate the clamping block 60 and ears 52–56.

The turns 14 and 15 are held against the respective insulating sheets 57 and 58 by the pair of the insulating members 24 and 25. The insulating members 24 and 25 each have a central opening aligned with opening 12 to permit passage of a work piece into opening 12. In addition, each insulating member 24, 25 is provided with annular recesses 68 and 70, respectively, for accommodating the very slight axial thickness of the turns 14 and 15. The insulating members 24 and 25 may be of any suitable insulating material.

In the illustrated embodiment, the magnetic field or fields produced by the coil 13 is confined by the pair of end plates 26 and 27 which are rectangular and are made of a suitable metal. The end plates 26 and 27 have openings therein aligned with the opening 12 to permit access of a work piece into opening 12.

As will be seen from FIGURE 2, the foregoing described elements are positioned together in the form of a sandwich. This sandwich is held together by the fastening means 28 which is repeatedly releasable to facilitate assembly of the coil assembly, and to facilitate disassembly thereof. This permits elements of the coil assembly to be readily replaced or repaired. The repeated releasable fastening means for holding the sandwich assembly together comprises a plurality of connecting bolts distributed around the periphery of the end plates 26 and 27. The bolts 28 extend from a recessed socket in one end plate 26 through aligned openings in the insulating members 24 and 25 and the gasket 65 to corresponding threaded openings in the other end plate 27. By removing the bolts 28, the entire sandwich may be disassembled readily. Furthermore, the end plates 26 and 27 and the bolts 28 provide sufficient holding force to counteract the tendency for the magnetic field produced in the apparatus to push the turns 14 and 15 axially away from the field shaper 11.

In operating the apparatus, leads 71 and 72 are attached to the respective ears 52 and 55 and are connected through a switch 73 across the source 16 of pulsed current. A current pulse applied to the coil 13 from the pulse source 16 when the switch 73 is closed produces a surge of current in the coil. This produces a pulsed magnetic field which induces a pulsed current in the field shaper 11, which current is concentrated on the inner surface of the flange 29 around the opening 12. This current pulse flowing on the inner surface of the field shaper creates a magnetic field in the central opening 12 which is more intense even than that field produced by the coil 13 because of the increased flux density within the aperture due to its smaller area. When a conductive work piece is positioned within the opening, the current pulse induced in the workpiece by the field in opening 12 interacts with the magnetic field in opening 12 to produce a force acting on the workpiece. The magnitude of the current utilizing is selected such that this force is sufficiently strong to produce a desired deformation of the workpiece.

As a result of the particular construction, of the invention, the coil assembly is capable of operating at relatively high power while maintaining an excellent life expectancy. Due to the prestressing of the bolts 33, movement between the portions 19 and 20 of the field shaper 11 on opposite sides of the slots 17 and 18 is minimized, thus preventing insulation wear. Because most of the mass of the shaper is about the opening 12 and because the prestressing forces are directed transversely of the opening, the field shaper is capable of withstanding stresses of considerable magnitude without failure. Because the field shaper 11 is cooled, heat removal occurs directly from the principal source of heat produced in the coil assembly. This reduces the chance of failure of the various structural elements of the coil assembly and reduces the chance of breakdown of the insulation therein due to excessive temperatures. The flat cross section turn design of the coil as opposed to round or nearly round cross sections permits the coil to carry higher current or lower density current for greater power and/or has a less chance of failure due to lower thermal stresses. Because the turns are substantially flat and are held relatively closed to the field shaper with a substantial surface area presented thereto, good heat transfer results from the turns to the cooled shaper and close magnetic coupling also results to minimize magnetic losses. The use of a double slot (i.e., slots 17 and 18) minimizes the potential difference between the two portions of the field shaper 11 and thereby reduces the chance of flashover at higher power level operation.

Disassembly of the device is facilitated by the particular construction utilized. The turns are not "potted," such as in an epoxy base, and thus may be readily disassembled and repaired. No welding, soldering or brazing is utilized in either structural or electrical connections, which further facilitates repair and replacement. Furthermore, the field shaper 11 may be readily replaced in the event a different configuration around the opening 12 is desired. In this respect, it is possible to utilize a field shaper having more than one opening so that several workpieces may be formed by a single coil pulse.

It may therefore be seen that the invention provides an improved magnetic forming coil assembly which is operable at high power levels for relatively long life. The coil assembly can be readily disassembled for repair and replacement and affords a substantial improvement over forming apparatus in the prior art. Other embodiments and various modifications of the coil assembly in addition to those shown in the drawings and discussed herein will become apparent to those skilled in the art, and such modifications and embodiments are intended to fall within the scope of the appendant claims.

What is claimed is:

1. A coil assembly for use in a magnetic forming apparatus, comprising a field shaper defining at least one opening for receiving a piece to be formed, said field shaper being of substantially greater dimensions in directions normal to the axis of said opening than in the direction parallel thereto, and having at least one surface which extends generally perpendicular to the axis of said opening, an insulating sheet having one surface thereto disposed immediately adjacent said surface of said field shaper, a conductive coil having a turn which is of a substantially flat configuration and cross section and is disposed immediately adjacent the other surface of said insulating sheet, means for electrically coupling said coil to a source of a current pulse, an insulating member disposed adjacent said coil for holding said coil against said insulating sheet, and means for mechanically securing said field shaper, insulating sheet, coil and insulating member together in a sandwich assembly.

2. A coil assembly in accordance with claim 1 wherein said field shaper has a second surface opposite said one surface which extends generally perpendicular to the axis of said opening, and said sandwich assembly includes a second insulating member disposed adjacent said second surface, and a pair of end plates of conductive material acting to confine the magnetic field produced by said coil.

3. A coil assembly in accordance with claim 1 wherein said field shaper is provided with coolant passages therein for conducting heat from said field shaper.

4. A coil assembly in accordance with claim 2 wherein said sandwich asesmbly comprises a further insulating sheet on said second surface of said field shaper, and said coil includes a second turn having a substantially flat configuration and cross section disposed between said further insulating sheet and said second insulating member, said second turn being electrically connected in series with said first arm.

5. A coil assembly in accordance with claim 2 wherein said securing means includes a plurality of threaded bolts extending through said sandwich assembly between said end plates.

6. A coil assembly in accordance with claim 1 wherein two slots are provided in said field shaper such that said field shaper is comprised of two discrete portions, an insulating layer is disposed in said slot, and coupling means mechanically connects together said portions of said field shaper.

7. A coil assembly in accordance with claim 6 wherein said coupling means comprise at least one threaded bolt extending through each of said portions of said field shaper, said bolt being prestressed such as to preclude movement of said portion of said field shaper when pulses are applied to said coil.

8. A coil assembly in accordance with claim 7 wherein said sandwich assembly comprises a further insulating sheet on said second surface of said field shaper, and said coil includes a second turn having a substantially flat configuration and cross section disposed between said further insulating sheet and said second insulating member, said second turn being electrically connected in series with said first turn.

References Cited

UNITED STATES PATENTS

| | | | |
|---|---|---|---|
| 3,126,937 | 3/1964 | Brower et al. | 72—56 |
| 3,195,335 | 7/1965 | Brower et al. | 72—56 |
| 3,345,844 | 10/1967 | Jansen et al. | 72—56 |

RICHARD J. HERBST, *Primary Examiner.*

UNITED STATES PATENT OFFICE
CERTIFICATE OF CORRECTION

Patent No. 3,383,890                      May 21, 1968

Paul Wildi

It is certified that error appears in the above identified patent and that said Letters Patent are hereby corrected as shown below:

In the heading to the printed specification, lines 4 to 6, "assignor to General Dynamics Corporation, New York, N. Y., a corporation of Delaware" should read -- assignor, by mesne assignments, to Gulf General Atomic Incorporated, San Diego, Calif., a corporation of Delaware --. Column 5, line 45, "repeated" should read -- repeatedly --. Column 6, line 1, "utilizing" should read -- utilized --.

Signed and sealed this 21st day of October 1969.

(SEAL)

Attest:

Edward M. Fletcher, Jr.                      WILLIAM E. SCHUYLER, JR.

Attesting Officer                              Commissioner of Patents